(No Model.)
F. LEWIS.
WATER DISTRIBUTER OR SPRINKLER.
No. 540,864. Patented June 11, 1895.
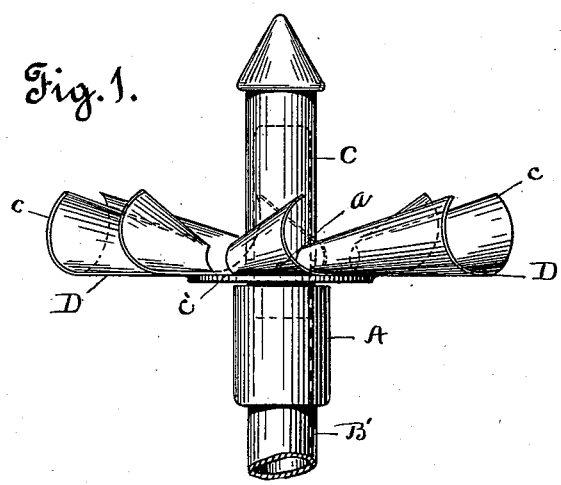
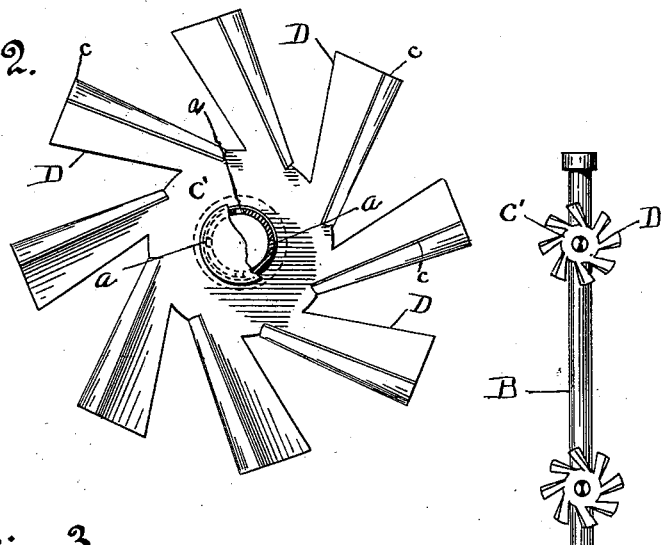
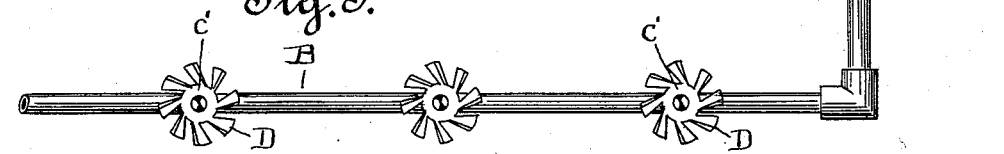
Witnesses.
Inventor.
Frank Lewis
by V. A. Acker
atty

UNITED STATES PATENT OFFICE.

FRANK LEWIS, OF PLEASANTON, CALIFORNIA.

WATER DISTRIBUTER OR SPRINKLER.

SPECIFICATION forming part of Letters Patent No. 540,864, dated June 11, 1895.

Application filed June 2, 1894. Serial No. 513,232. (No model.)

*To all whom it may concern:*

Be it known that I, FRANK LEWIS, a citizen of the United States, residing at Pleasanton, in the county of Alameda and State of California, have invented certain new and useful Improvements in Water Distributers or Sprinklers; and I do hereby declare the following to be a full, clear, and exact description of said invention, such as will enable others skilled in the art to which it most nearly appertains to make, use, and practice the same.

The present invention has relation to an improved water distributer or sprinkler, which consists in the arrangement of parts and details of construction as will be hereinafter more fully set forth in the drawings, described and pointed out in the specification.

This invention is designed more especially for use in connection with dwellings, barns, stables and hop driers, more especially the latter, although it may be equally as well utilized as a lawn sprinkler, and it has for its object to more thoroughly separate and distribute the water discharged therefrom, whereby the same is distributed over a larger area and a more perfect saturation or wetting permitted than can be accomplished by the ordinary sprinkler, for the reason that in my device a free and uninterrupted outflow is allowed to the water and the discharging vanes or arms are so constructed that the water falls therefrom in a heavy spray similar to rain fall. Hence every portion of the building or lawn within the radius described by the water is absolutely wetted.

The foregoing sufficiently sets forth the object and purpose of my invention and for a more full and comprehensive understanding of the same, reference must be had to the accompanying sheet of drawings, wherein—

Figure 1 is a vertical elevation of the sprinkler. Fig. 2 is a top plan view of the distributing disk and arms or vanes; and Fig. 3 is a top plan view of a water-supply pipe, showing a series of sprinklers or distributers connecting thereto.

The letter A is used to indicate the hollow screw threaded boss, which may be connected to the water supply pipe B, by means of the branch pipe B', or the part B' may designate the hollow stand of a lawn sprinkler.

To the hollow boss A is secured the hollow cylindrical cap or tube C, upon which is first fitted the rotatable disk C'. This disk when the parts are united and held in the position illustrated by Fig. 1, rests upon the shoulder formed by the top of the hollow boss.

The disk C' may be cut away toward the center so as to provide a series of arms D, one edge or side, say c, of which arms I bend or curve upward so as to form the segment of a circle. These arms form a discharge way for the water and they are so cut as to lie tangential to the center of the disk. Consequently the water is discharged tangentially. However, if so desired the arms or vanes may be formed separate and be soldered to the disk C'. The upwardly curved portion or side c, of the arms or vanes, extends above the impact line of the water. Hence the discharge of the water will be from the end of the vanes or arms above the said line of impact. Consequently the water which is discharged from one of the arms or vanes does not strike against the next vane or arm.

Within the hollow cap or tube C, I cut a series of openings or apertures a, said openings being made above the disk C'. Through these openings or apertures the water from the supply pipe or hose makes its escape with such force as by the impact thereof against the curved vanes or arms D to cause the rotation of the disk C'. As this disk is rotated the water is thrown from the curves, vanes or arms while describing a circle. However, the discharge of the water is not from any one point of the vanes or arms solely, but is distributed its entire length, (although the main body of the water is discharged from the outer end of the curved arms or vanes.) Consequently during the circular movement of the disk every portion of the ground is wetted within the described limits of the water throw. The peculiar shape of the vanes or arms, being approximately that of an arc of a circle in cross section, and by reason of the same being located tangential to the disk, not only causes a perfect separation of the water so as to impart a fall thereto similar to rain, but likewise permits the water being thrown a greater distance during the rotation of the disk.

When my device is made use of in connection with barns, warehouses, stables, or similar places, a water pipe is arranged around the ceiling in any suitable manner, and a series of the sprinklers connected thereto by means of branch pipes. In case of a fire it is only necessary to turn on the cock of the supply pipe when each sprinkler will immediately commence the distribution of water and in a few moments the interior of the building will be entirely saturated. Owing to the construction of the device there is no likelihood of the same becoming clogged with dirt and rendered useless.

When made use of as a lawn sprinkler, the disk should be raised to a distance of about six feet from the ground in order that the falling water may present the appearance of rain.

The device is simple of construction, inexpensive and more durable than any device adapted for a similar purpose that I am aware of. It may be located, if desired, around the top of a house or along the sides thereof.

It will be observed that the outflow of the water is not obstructed in any manner whatever. Consequently I secure the full force or pressure of the same, and hence cover a greater area of distribution. This is due to the fact that my vanes and disks are not inclosed so as to form a rotatable sprinkling reservoir as is usual in this style of devices, but are open. By the construction of my vanes the water does not react. Hence power of the stream is not consumed.

Having thus described my invention, what I claim as new, and desire to secure protection in by Letters Patent, is—

The combination of a hollow boss, a hollow cylindrical cap secured to and projecting upward from the boss and provided with a series of diametrical apertures or perforations just above the boss, a rotatable disk resting on the boss below the plane of the said perforations, and a series of arms projecting tangentially from the said disk in a horizontal plane, each of said arms having one of its side or longitudinal edges curved upward so as to extend across and above the plane of the perforations in the cylindrical cap.

In testimony whereof I affix my signature in presence of two witnesses.

FRANK LEWIS.

Witnesses:
N. A. ACKER,
SOL J. LEVY.